United States Patent
Ogawa

(10) Patent No.: US 6,859,192 B1
(45) Date of Patent: Feb. 22, 2005

(54) METHOD FOR EVALUATING QUALITY OF IMAGE ON DISPLAY DEVICE

(75) Inventor: Eiji Ogawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/534,578

(22) Filed: Mar. 27, 2000

(30) Foreign Application Priority Data

Mar. 26, 1999 (JP) .......................... 11-083914

(51) Int. Cl.⁷ .......................... G09G 5/00; G09G 5/02; G06K 9/00
(52) U.S. Cl. .......................... 345/77; 345/617; 345/691; 345/694; 345/208; 382/168; 382/169; 382/170; 382/254; 382/269; 382/274
(58) Field of Search .......................... 345/616–618, 345/440, 440.1, 690–691, 694, 698, 699, 208, 10, 12, 13, 20, 77, 94, 428, 581, 588, 589; 382/2.1, 161–162, 165, 168, 169, 170, 171–172, 181, 254, 255–256, 264, 266, 267, 269, 274–276, 112

(56) References Cited

U.S. PATENT DOCUMENTS

| | | | | |
|---|---|---|---|---|
| 5,109,425 A | * | 4/1992 | Lawton | 382/1 |
| 5,351,201 A | * | 9/1994 | Harshbarger et al. | 364/551.01 |
| 5,572,444 A | * | 11/1996 | Lentz et al. | 364/551.01 |
| 5,715,334 A | * | 2/1998 | Peters | 382/254 |
| 5,912,723 A | * | 6/1999 | Maddess | 351/246 |
| 6,213,956 B1 | * | 4/2001 | Lawton | 600/558 |

FOREIGN PATENT DOCUMENTS

| | | | | |
|---|---|---|---|---|
| JP | 403123292 | * | 5/1991 | H04N/17/04 |
| JP | 411355611 | * | 12/1994 | H04N/5/208 |
| JP | 401184579 | * | 7/1998 | G06F/15/60 |

* cited by examiner

Primary Examiner—Matthew C. Bella
Assistant Examiner—Wesner Sajous
(74) Attorney, Agent, or Firm—Sughrue Mion, PLLC

(57) ABSTRACT

The method for evaluating a quality of an image on a display device displays a test pattern having different contrast intensities on a display screen of the display, then determines a contrast intensity at which the test pattern is visually discernible and uses the thus determined contrast intensity as a value for evaluation of granularity on the display device. The method is optimal for achieving quantitative and objective visual evaluation of image quality, particularly, its granularity.

16 Claims, 3 Drawing Sheets

METHOD FOR EVALUATING QUALITY OF IMAGE ON DISPLAY DEVICE

BACKGROUND OF THE INVENTION

This invention relates to a method for evaluating a quality of an image on a display device, more particularly to a method for evaluating the image quality, especially granularity, of an image displayed on CRT (cathode ray tube), LCD (liquid crystal display) or other soft copy display devices (which are hereunder collectively referred to as "display device").

Evaluations of the image quality of images on display devices such as the CRT, the LCD and the others, as exemplified by brightness, image resolution and granularity, provide important information when selecting the right display device to be used by comparing the performance of one display device with that of another. Image quality evaluation is also very important for the purpose of evaluating the degree of image deterioration that occurs during the use of a specific display device. Whichever type of evaluation is to be performed, it is essential that the quality of images on display devices be evaluated quantitatively.

Before shipping the display device they have produced, manufacturers test and adjust on their own to verify or check that the intended image quality is ensured. However, once the display devices have been shipped, no practical methods and devices are available for verifying image quality and it is the user alone who is responsible for checking the quality of the image being displayed. Most users rely upon visual evaluation to check the quality of the images being presented on display devices.

Visual evaluation is performed using test patterns capable of integrated verification of various image quality and characteristic factors and an SMPTE pattern is best known of such test patterns. Depending on the need, the user of a display device allows it to display a test pattern such as an SMPTE pattern, examines it, checks only superficial or very basic features of the quality of the image being shown on the display device, and determines whether its use should be continued or not.

In practice, what the user can say after having applied this visual approach is that "two devices produce images that look differently in this particular area" (comparison between two devices) or, speaking of a certain device, "it seems to produce an image of which a particular area looks slightly different than it did initially" (time-dependent change of the device); in other words, the visual method can only perform very subjective and qualitative evaluation and it has been impossible to achieve quantitative and objective evaluation.

In particular, the development of a specific method or device for enabling quantitative visual evaluation of granularity has been practically nil.

SUMMARY OF THE INVENTION

The present invention has been accomplished under these circumstances and has as an object providing a method for evaluating a quality of an image on a display device that is free from the aforementioned problems of the prior art and which is optimal for achieving quantitative and objective visual evaluation of image quality, particularly, its granularity.

This object of the present invention can be attained by a method for evaluating a quality of an image on a display device, comprising the steps of displaying a test pattern having different contrast intensities on a display screen of the display device, determining a contrast intensity at which the test pattern is visually discernible and using the thus determined contrast intensity as a value for evaluation of granularity on the display device.

Preferably, the test pattern having different contrast intensities contains areas having different contrast intensities. Alternatively, the test pattern having different contrast intensities is such that test patterns each of which has a single contrast intensity are sequentially presented on the display screen of the display device to produce varying contrast intensity with time.

In another preferred embodiment, the test pattern having different contrast intensities varies in amplitude but the average of amplitudes is generally constant. The test pattern having different contrast intensities may be white noise.

Preferably, the test pattern having different contrast intensities has different frequencies for the respective contrast intensities.

In one way to implement the method of the invention, the value for evaluation of granularity is compared with a value preliminarily acquired by the display device and an amount of the difference between the two values is output. In this case, the method provides an effective means of telling the time-dependent change in granularity that has occurred after installation of the display device.

DETAILED DESCRIPTION OF THE INVENTION

We now describe several embodiments of the invention in detail with reference to the preferred examples shown in the accompanying drawings.

Figure 1:
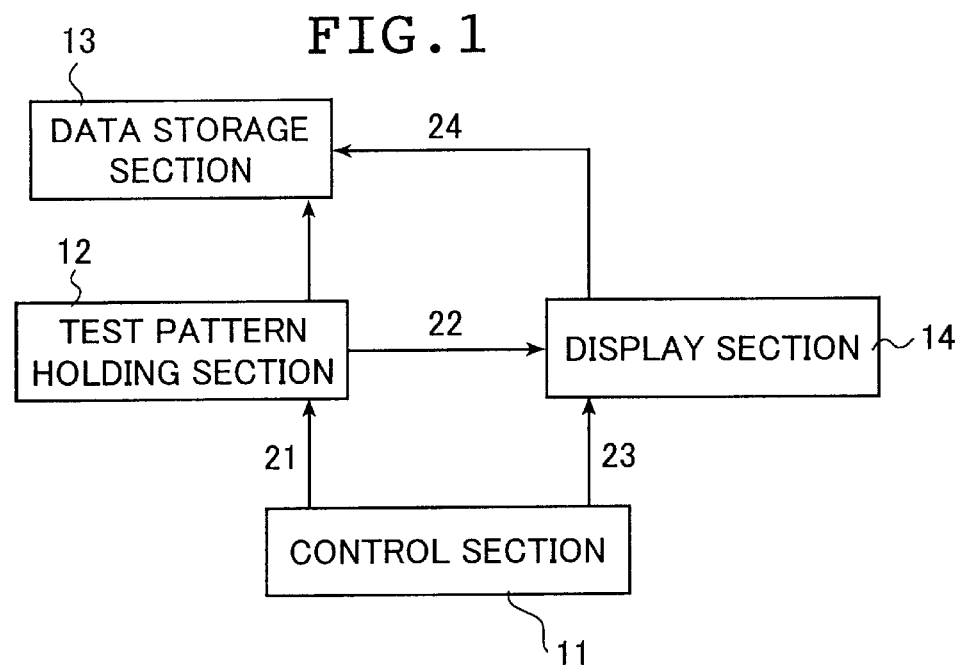
FIG. 1 is a block diagram showing schematically an apparatus for evaluating the quality of an image on a display device according to an embodiment of the invention.

FIG. 1 is a block diagram showing schematically an apparatus for evaluating the quality of an image on a display device according to an embodiment of the invention. In the drawing, reference numeral 11 designates a control section such as a keyboard; 12 is a test pattern holding section which holds test patterns for granularity evaluation that are to be described later; 13 is a data storage section which stores the initial data (or data for the result obtained by evaluating said test patterns at the time when the display device was installed and which also stores the data for the results of subsequent evaluations that were performed consecutively; and 14 is a display section.

Having outlined the construction of the evaluation apparatus, we now describe the basic steps in operating the apparatus according to an embodiment of the invention. To perform evaluation of images on a display device (which is hereunder referred to simply as "test"), the first step is one that is performed when the display device is installed and predetermined granularity test patterns being held by the test pattern holding section 12 are presented (displayed) on the display section 14 and subjected to visual evaluation in the manner to be described later, and the data for the result of visual evaluation (so-called "initial data") is stored in the data storage section 13.

If the test is to be performed when a certain period of time has lapsed after installation of the display device, the same test patterns as mentioned above which are held by the test pattern holding section 12 are displayed on the display section 14 and also evaluated visually to acquire data on the result of evaluation (which is hereunder referred to simply as "data"). The acquired data is stored in the data storage section 13. When acquiring the data, the test patterns are preferably displayed under conditions that are as close as possible to those employed when acquiring the initial data.

Figure 2:
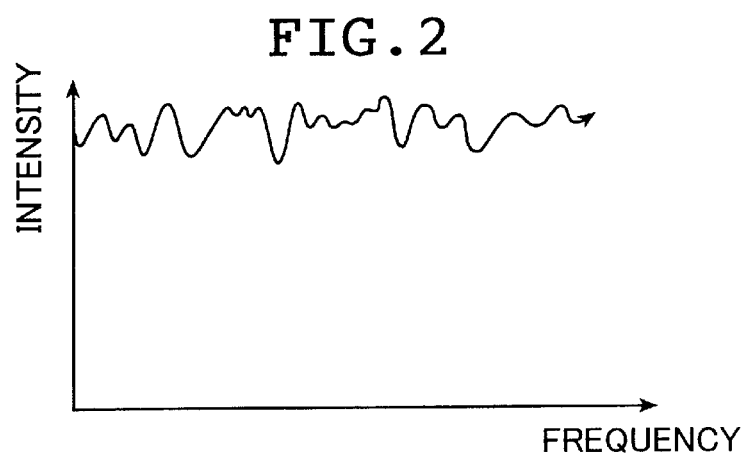
FIG. 2 shows an example of a basic profile of a test pattern for evaluating image granularity.

We now describe the granularity test pattern used in the steps described above. A first example is so-called "white noise" which varies uniformly over a broad frequency range as shown in FIG. 2. In the present invention, a plurality of such "white noise" patterns are provided, with the amplitude varying at two or more levels but with its center being held at a generally constant value.

Figure 3:
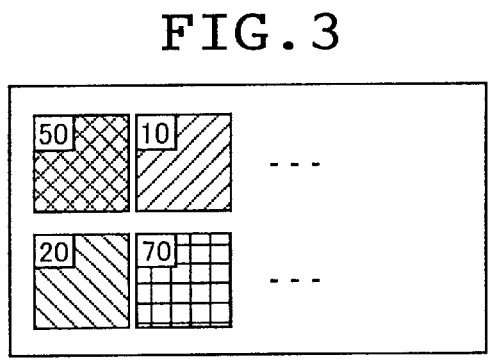
FIG. 3 shows an example of a specific profile of a test pattern for evaluating image granularity.

Preferably, such plural patterns are arranged randomly on a single sheet ("randomly" means that the change in amplitude has no regular correspondence to relative positions of arrangement) to prepare a complex test pattern which is shown in FIG. 3. FIG. 3 shows diagrammatically a plurality of white noise patterns having the amplitude varied at two or more levels. The numerals in FIG. 3 denote relative amplitudes of the respective white noise patterns (which, in the case under consideration, represent differences in brightness, or density differences in gray scale (black and white) on the display screen). For the sake of convenience, different patterns are hatched differently to show relative differences in noise intensity. In the illustrated case, a maximum value is 100 and a minimum value is 10 and a pattern assigned a smaller value has a smaller density difference.

In plain words, a display device (or one state of the display device) that is capable of discerning up to the pattern with the value 10 offers better image quality in terms of granularity than a display device (or another state of the same display device) that is only capable of discerning up to the pattern with the value 50. This is none other than the quantitative evaluation of what has heretofore been evaluated only qualitatively, as exemplified by the comment saying that "two devices produce images that look differently in this particular area" (comparison between two devices) or, speaking of a certain device, "it seems to produce an image of which a particular area looks slightly different than it did initially" (time-dependent change of the device).

Figure 4:
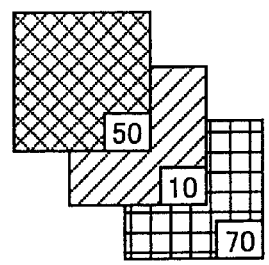
FIG. 4 shows another example of the specific profile of a test pattern for evaluating image granularity.

FIG. 4 shows another example of granularity test patterns that may be used in the method of the invention. Unlike the test pattern used in the previous example, one granularity test pattern consists of only one white noise pattern having a single (specified) amplitude and, with the lapse of time, white noise patterns having different amplitudes are sequentially substituted and represented on the display screen.

In other words, a plurality of white noise patterns having different amplitudes are arranged spatially (to provide a so-called "spatial side-by-side arrangement") in the previous example whereas the granularity test pattern according to the example under consideration consists of a plurality of white noise patterns having different amplitudes that are arranged temporally (to provide a so-called "temporal side-by-side arrangement"). The wording "displaying a test pattern having different contrast intensities on the screen of a display device" in the invention covers both "spatial side-by-side arrangement" and "temporal side-by-side arrangement".

Figure 5:
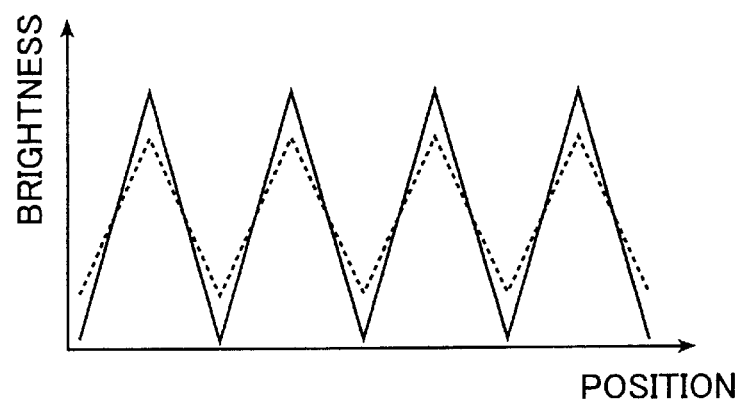
FIG. 5 shows another example of the basic profile of a test pattern for evaluating image granularity.
Figure 6:
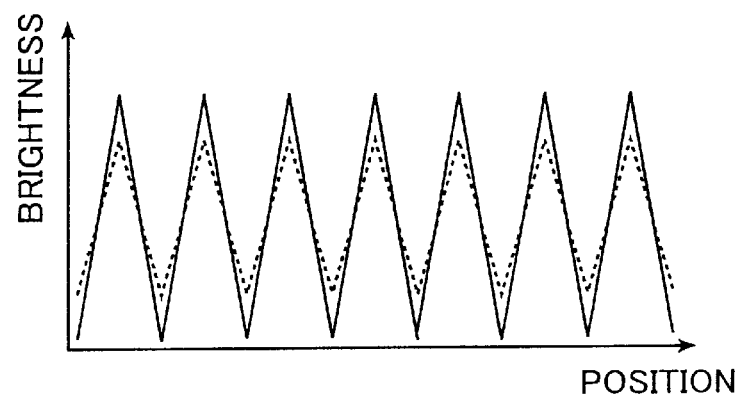
FIG. 6 shows a modification of the basic profile of a test pattern with enhanced frequencies.

Other granularity test patterns that can be used in the invention include an (artificial) periodic pattern having a limited frequency range as shown in FIG. 5. The frequency range may be enhanced as shown in FIG. 6. In both FIGS. 5 and 6, the horizontal axis of the graph plots position and the vertical axis plots amplitude (contrast intensity). By using a plurality of test patterns having different frequency ranges, one can accomplish granularity evaluation for each frequency range.

In the actual case of evaluation (which may be called "test"), one of the above-described types of granularity test patterns are used, with the frequency being optionally varied over a certain range, to determine the discernible amplitude (contrast intensity), which is then stored in the data storage section 13. On the basis of the stored data, comparison of image quality is made between two devices or between two image states of one device obtained at different times. In the latter case, the data obtained at the time of the test is compared with the initial data stored in the data storage section 13 that was obtained using the same granularity test patterns. In the former case, the test is performed on two different display devices using the same granularity test patterns and the data obtained from one device is compared with the data obtained from the other device. In either case, comparison is made by referring to the minimum discernible contrast level.

According to the examples described above, the quality of images produced from any display device can be tested using standardized granularity test patterns. In addition, the change in image quality from a certain display device that has occurred over time can be known quantitatively by comparing the data of test with the data initially acquired at the time of installing the device. This time-dependent change in image quality can also be evaluated for divided frequency ranges as will be described later in this specification.

In one application of the invention, the user of a display device may compare the obtained value of evaluation with a predetermined value (threshold) and, if the latter is exceeded, take action such as adjustment or replacement of the display device. If the user performs such test periodically, he can maintain the quality of images from his display device at high level.

We now describe a specific procedure for processing and making comparison according to the foregoing examples using a test pattern comprising a plurality of the white noise patterns shown in FIG. 2 that are spatially arranged as shown in FIG. 3. As already mentioned, the respective patterns have 10 different amplitude levels but the amplitude center is generally constant.

Referring to FIG. 1, the operator touches the control section 11 which then issues a command to the test pattern holding section 12 to present predetermined test patterns on the display section 14 (as indicated by line (21) in FIG. 1), whereupon the test pattern holding section 12 displays the designated test patterns on the display section 14 (as indicated by line (22) in FIG. 1). Looking at the displayed test patterns, the operator determines the discernible threshold pattern and touches the control section 11 to enter the information about that pattern (as indicated by line (23) in FIG. 1).

The input data for the discernible threshold pattern (in the example under consideration, the data is expressed in terms of amplitude level or contrast intensity) is sent to the data storage section 13, in which it is stored together with the already stored initial data (as indicated by line (24) in FIG. 1).

The stored data are used in the manner already described above.

Figure 7:
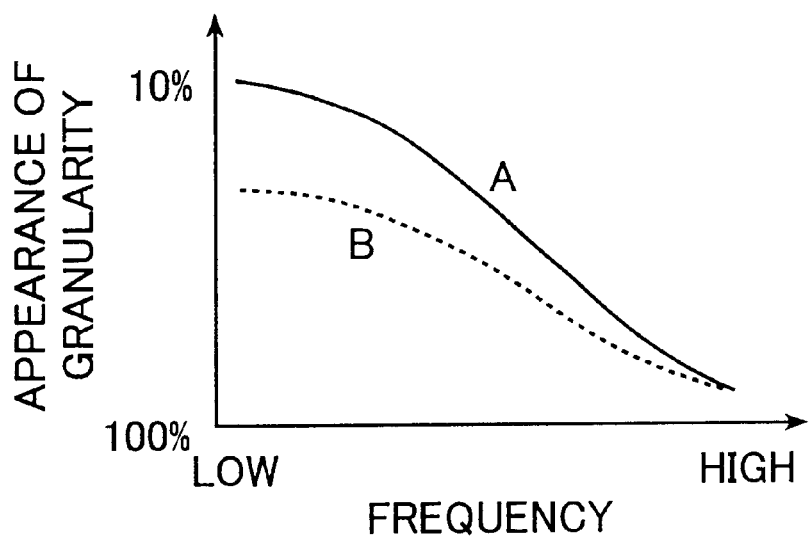
FIG. 7 is a graph showing an exemplary result of evaluation of a display device using the test patterns shown in FIGS. 5 and 6.

FIG. 7 shows an exemplary result of an experiment in which a display device is evaluated for the frequency response characteristics of granularity using a plurality of dedicated granularity test patterns keyed to different frequencies. The graph in FIG. 7 plots frequency on the horizontal axis and the appearance of granularity on the vertical axis. As the appearance of granularity goes up the scale on the vertical axis (for example, as it approaches 10%), a test pattern with lower contrast was discernible; on the other hand, as it goes down the scale on the vertical axis (for example, as it approaches 100%), only a test pattern with higher contrast was discernible.

The solid curve A in FIG. 7 represents the characteristics of the display device at the time of its installation (i.e., at initial time) and the dashed curve B represents the characteristics after the lapse of a certain time period (i.e., deteriorated characteristics). The wider the gap between the two curves, the greater the deterioration that has occurred in the display device.

Figure 8:
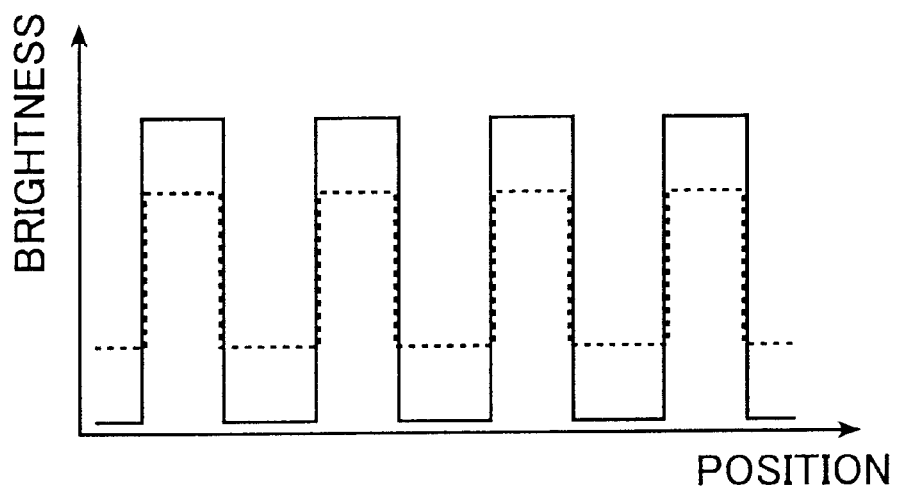
FIG. 8 shows yet another example of the basic profile of a test pattern for evaluating image granularity.

FIG. 8 shows yet another example of the granularity test patterns that can be used in the present invention. This example is characterized in that brightness changes like a rectangular wave, or in binary values, as position varies. The test pattern shown in FIG. 8 has the advantage of being useful in evaluating image parameters other than granularity, for example, in response measurement.

According to the examples described above, the user of a display device inputs an evaluation of how test patterns look like and yet he can accomplish quantitative and objective evaluation of the granularity of images from the display device.

It should be noted that the foregoing examples are given for illustrative purposes only and are by no means intended to limit the present invention.

As described above in detail, the present invention successfully realizes a method of evaluating the quality of images on a display device that is optimal for achieving quantitative and objective visual evaluation of image quality, particularly, its granularity. If the method is applied to evaluate the quality of images on display devices for use in medical diagnosis, its ability to perform quantitative and objective evaluation contributes to the maintenance of high image quality, thus increasing the efficiency of diagnosis while improving system reliability.

What is claimed is:

1. A method for evaluating a quality of a display device, comprising the steps of:
   displaying a test pattern having different contrast intensities on a display screen of the display device;
   determining a contrast intensity at which said test pattern is visually discernible; and
   using the thus determined contrast intensity as a value for evaluation of granularity of said display device.

2. The method according to claim 1, wherein said test pattern having different contrast intensities contains areas having different contrast intensities.

3. The method according to claim 1, wherein said test pattern having different contrast intensities is such that test patterns each of which has a single contrast intensity are sequentially presented on the display screen of the display device to produce varying contrast intensity with time.

4. The method according to claim 1, wherein said test pattern having different contrast intensities varies in amplitude but has a generally constant amplitude center.

5. The method according to claim 1, wherein said test pattern having different contrast intensities is white noise.

6. The method according to claim 1, wherein said test pattern having different contrast intensities has different frequencies for the respective contrast intensities.

7. The method according to claim 1, wherein said value for evaluation of granularity is compared with a value preliminarily acquired by said display device and an amount of the difference between the two values is output.

8. The method according to claim 1, wherein a test pattern includes a plurality of patterns having disparate intensity levels placed adjacent to each other in space, and determining a contrast intensity at which said test pattern is visually discernible comprises selecting one of said plurality of patterns having disparate intensity levels among said plurality of patterns.

9. The method of claim 8, wherein evaluation of granularity comprises using said selected test pattern, and varying said test pattern over a range of frequencies.

10. The method of claim 9, further comprising evaluating quality of an image for a second device by displaying said test pattern having different contrast intensities on a display screen of the second device;
    determining a second contrast intensity at which said test pattern is visually discernible on said second device; and
    using the second contrast intensity as a value for evaluation of granularity of the second device; and
    comparing granularity of the first device and the second device.

11. The method of claim 8, wherein the plurality of test patterns comprise a plurality of white noise patterns.

12. The method of claim 11, wherein the evaluation of granularity follows said determination of contrast intensity.

13. The method according to claim 1, wherein a test pattern includes a plurality of patterns having disparate intensity levels placed adjacent to each other in time, and determining a contrast intensity at which said test pattern is visually discernible comprises selecting one of said plurality of patterns having disparate intensity levels among said plurality of patterns, wherein said plurality of patterns comprise white noise patterns.

14. The method of claim 13, wherein evaluation of granularity comprises using said selected test pattern, and varying said test pattern over a range of frequencies.

15. The method of claim 1, wherein determining the contrast intensity at which said test pattern is discernible comprises selection of a single contrast intensity level.

16. The method of claim 1, further comprising evaluating quality of an image for a second device by displaying said test pattern having different contrast intensities on a display screen of the second device;
    determining a second contrast intensity at which said test pattern is visually discernible on said second device; and
    using the second contrast intensity as a value for evaluation of granularity of the second device; and
    comparing granularity of the first device and the second device.

\* \* \* \* \*